United States Patent
Kaczynski

(10) Patent No.: US 6,438,856 B1
(45) Date of Patent: Aug. 27, 2002

(54) APPARATUS FOR FINE POSITIONING OF A COMPONENT, AND COORDINATE MEASURING MACHINE HAVING AN APPARATUS FOR FINE POSITIONING OF A COMPONENT

(75) Inventor: Ulrich Kaczynski, Bad Nauheim (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 9 days.

(21) Appl. No.: 09/685,088

(22) Filed: Oct. 11, 2000

(30) Foreign Application Priority Data

Oct. 11, 1999 (DE) .......................................... 199 49 044

(51) Int. Cl.$^7$ .............................................. G01B 7/008
(52) U.S. Cl. .......................................... 33/503; 33/561
(58) Field of Search ........................ 33/503, 547, 559, 33/561, 556, 558

(56) References Cited

U.S. PATENT DOCUMENTS

| | | | | |
|---|---|---|---|---|
| 3,869,799 A | * | 3/1975 | Neuer et al. | 33/503 |
| 3,946,492 A | * | 3/1976 | DuBose, Jr. | 33/558 |
| 4,553,332 A | * | 11/1985 | Golinelli et al. | 33/561 |
| 5,119,568 A | * | 6/1992 | Vesco et al. | 33/559 |

OTHER PUBLICATIONS

Hoffrogge et al., "Eine Doppelparallelfeder als Präzisionsführung", PTB–Mitteilungen, Feb. 1973, pp. 79–82.

Physik Instruments (PI) GmbH & Co., "M–105/M–106 Linear Positions with Ball Bearing Guides", English and German versions, pp. 3–12—3–13 (English Version).

Rainer Glöβ et al., "Systeme zur Nanopositionierung", F&M Piezoaktorik, Sep. 6, 1999, pp. 64–68.

* cited by examiner

Primary Examiner—Christopher W. Fulton
(74) Attorney, Agent, or Firm—Crowell & Moring LLP

(57) ABSTRACT

An apparatus for fine positioning of a component has a symmetrical, one-piece double parallel spring element having a movable center bar, suspended on bending points, which carries the component. The center bar is preloaded in the direction of the frame by way of an elastic element. The center bar can be adjusted in almost ideally tilt-free fashion with a fine adjustment element arranged between the center bar and frame. A high-precision coordinate measuring instrument having a measurement stage for receiving a substrate that is to be measured, an incident-light and/or transmitted-light illumination device, and an imaging optical system with a vertical optical axis, has a fine positioning apparatus of this kind with a vertically arranged double parallel spring element. Mounted on its center bar is an objective holder, and thereon the objective with an objective axis parallel to the movement direction of the center bar.

24 Claims, 4 Drawing Sheets

APPARATUS FOR FINE POSITIONING OF A COMPONENT, AND COORDINATE MEASURING MACHINE HAVING AN APPARATUS FOR FINE POSITIONING OF A COMPONENT

CROSS REFERENCE TO RELATED APPLICATIONS

This invention claims priority of a German filed patent application DE 199 49 044.9.

FIELD OF THE INVENTION

The invention concerns an apparatus for fine positioning of a component, and a coordinate measuring machine having an apparatus for fine positioning of a component.

BACKGROUND OF THE INVENTION

The article of C. Hoffrogge and H.-J. Rademacher entitled "A double parallel spring as precision guide system" [Eine Doppelparallelfeder als Präzisionsführung], PTB-Mitteilungen 2/73, pp. 79–82, describes an apparatus for fine positioning of a component having an integrally machined double parallel spring. The double parallel spring has a stationary frame and a movable center bar that is retained by multiple parallel springs. Energy transfer from a spindle drive arranged outside the double parallel spring to the center bar is accomplished by way of a coupling member and a wire cable. As a result, the overall system is very large. The double parallel spring described is provided in particular for operation in a horizontal position. Operation in a vertical position requires considerable additional design effort with regard to energy transfer, and the attachment of heavy and therefore also large compensation weights. The overall structure thereby becomes even larger and heavier. A displacement of the center bar with little tilting is possible only by way of a complicated distribution of the applied forces.

The present apparatus for fine positioning of a component is to be used in particular for fine positioning of an objective as it is focused in an ultrahighprecision coordinate measuring machine. A coordinate measuring machine of this kind has an X-Y measurement stage for receiving a substrate whose patterns are to be measured with nanometer precision. The objective with the subsequent imaging optical system is arranged above the X-Y measurement stage. After each change in measurement stage position, e.g. after moving to another pattern that is to be measured, refocusing by positioning of the objective is necessary, since even small irregularities in the measurement stage surface, a minor wedge error in the substrate surface, and slight deflection of the substrate (usually mounted on three support points) will result in a vertical discrepancy in the focal position.

One known measurement method involves using the objective to scan (for example optically) a pattern that is to be measured, and then focusing. The position of the X-Y measurement stage is then measured interferometrically, and the position of the pattern in relation to a reference point is determined from the measurement stage position with nanometer accuracy. Pattern widths or pattern spacings, for example, can then be determined from multiple measurements.

At the desired accuracy, even small sources of error in the position determination must be detected and either eliminated or minimized in the instrument design. One such error source is tilting of the objective with respect to the optical axis of the coordinate measuring machine. This tilting occurs upon vertical movement of the objective during focusing, and results in a lateral offset of the objective axis on the substrate having the patterns to be measured. A pattern to be measured is therefore optically sensed by a tilted objective as being in a different, laterally offset position than it would be by an untilted objective. This discrepancy becomes a measurement error in the measurement result for the position determination of the pattern being measured.

SUMMARY OF THE INVENTION

It is therefore an object of the invention to create an apparatus for fine positioning of a component which allows a precise rectilinear movement path for the component that deviates only extremely slightly from a reference axis.

This object is achieved with an apparatus for fine positioning of a component having a one-piece double parallel spring element having an axis of symmetry, including: i) an external stationary frame on whose inner side two holding elements are shaped at positions lying opposite one another about the axis of symmetry; ii) a movable center bar between the holding elements; iii) two movable side bars arranged on either side of the center bar; and iv) pairs of parallel connecting elements, arranged on either side of each holding element and equipped at the ends with bending points, the first connecting element being in each case joined to one side bar and one holding element, and the second connecting element being in each case joined to the side bar and the center bar. An elastic element is located between a holding element and one end of the center bar, and a fine adjustment element is arranged between one holding element and one end of the center bar. The dependent claims recite advantageous embodiments of the invention.

An apparatus according to the present invention for vertical fine positioning of a component has a double parallel spring element that is fabricated in one piece and is configured symmetrically with respect to an axis of symmetry. It comprises a stationary frame that is attached, for example, to a supporting part of a higher-order device. A movable center bar is arranged on the axis of symmetry in the center of the frame. The component to be positioned can be attached to the center bar. Two side bars are movably arranged inside the frame on either side of the center bar.

Two parallel, straight connecting elements are arranged in the region of the ends of each side bar. Bending points in the form of leaf springs are configured at the ends of each connecting element. The first of the two parallel connecting elements creates, by way of the bending points shaped onto it, a movable connection between the side bar and the frame. The second parallel connecting element creates, by way of the bending points shaped onto it, a movable connection between the side bar and the center bar. The center bar is thereby movably connected, with four connecting elements, symmetrically to the two side bars.

The center bar is preloaded in the direction of the frame by way of a spring. The center bar must not touch the frame, since any such contact would cause internal distortion of the double parallel spring element. This would disadvantageously change the bending characteristics of the bending points, and move the center bar out of its movement direction lying strictly parallel to the axis of symmetry. The spring can be configured, for example, as a compression spring or as a tension spring.

Arranged between one end of the center bar and the frame is a fine adjustment element with which the center bar can be adjusted in tilt-free fashion in its longitudinal direction against the spring force of the compression spring. If the adjustment travel of the fine adjustment element is to be not only adjustable but also controllable, it is advantageous to connect the adjustment element to a high-resolution length measurement system for measuring its instantaneous setting. The measured values of the length measurement system are conveyed as the controlled variable to the input of an electronic control system whose output signals control the settings of the fine adjustment element.

A fine adjustment screw, which is driven in either manual or motorized fashion, can be used as the fine adjustment element. In a particularly advantageous embodiment, the fine adjustment element is configured as a piezoelement whose length changes as a function of the magnitude of an applied voltage.

In the apparatus according to the present invention, the configuration of the double parallel spring element is of particular importance. For example, the double parallel spring element must be shaped as a single piece from one plate. The plate must be sufficiently thick that the bending points are configured as wide leaf springs. This is the only way to prevent tilting of the center bar with respect to the axis of symmetry, and to make the double parallel spring element sufficiently stable, in particular in a vertical arrangement. In addition, the plate must be made of a material with a low coefficient of thermal expansion and good flexural characteristics. The low coefficient of thermal expansion ensures that the flexural characteristics of the double parallel spring element remain stable during operation in the presence of small fluctuations in ambient temperature. In an advantageous embodiment the double parallel spring element is made of an Ni36 steel plate.

In the manufacturing process, it is important to ensure that the symmetrically designed configuration of the double parallel spring element is not impaired by excessive production tolerances in material machining, for example cutting, milling, and the like. Any asymmetry in the finished double parallel spring element created in this fashion results in asymmetrical flexural characteristics and in an undesirable tilting movement of the center bar and thus also of the component. It has been demonstrated that shaping of the double parallel spring element using a mechanical machining process generally introduces too much heat into the material, thus causing internal stresses in the material especially at the bending points, and resulting in inhomogeneous flexural characteristics in the individual bending points.

It has further been demonstrated that better and uniform flexural characteristics in the bending points are achieved with electrodischarge machining, which does not heat the material and thus avoids internal stresses in the material. Thus in an advantageous embodiment of the apparatus according to the present invention, the bending points of the double parallel spring element are shaped using an electrodischarge method. In a further and particularly advantageous embodiment of the apparatus according to the present invention, the entire double parallel spring element is shaped using an electrodischarge method. When symmetrical flexural characteristics in the bending points are achieved in this fashion, the springs and the fine adjustment element are arranged in such a way that energy is transferred to the axis of symmetry of the double parallel spring element. This ensures tilt-free movement of the center bar and thus of the component that is to be positioned.

If asymmetries in the flexural behavior of the bending points occur as a result of the manufacturing process, it is advantageous to perform the energy transfer to the spring and the fine adjustment element deliberately outside the axis of the symmetry. With this asymmetrical energy transfer, the asymmetries in flexural characteristics can be compensated for.

The apparatus according to the present invention offers the advantage that it guarantees almost ideal tilt-free movement of the center bar and thus of the component to be positioned. In addition, the apparatus according to the present invention has very compact overall dimensions because the fine adjustment element is arranged inside the frame.

It is a further object of the present invention to create a high-precision measuring instrument having an apparatus for fine positioning of a component, in particular an objective, in which the tilt angle of the objective axis with respect to the strictly vertical optical axis of the high-precision measuring instrument is extremely small. The high-precision measuring instrument is configured, in this context, as a coordinate measuring instrument.

This further object is achieved with a coordinate measuring machine having an apparatus for fine positioning of a component. The coordinate measuring instrument for determining the position, relative to a reference point, of patterns on a transparent substrate includes: a) an incident-light illumination device on a vertical optical axis; b) a frame-shaped measurement stage, displaceable vertically and relative to the optical axis and having an interferometric position determination system, for receiving the substrate; c) an imaging device having an objective that is to be focused, for imaging the patterns of the substrate; d) a vertically arranged one-piece double parallel spring element having an axis of symmetry, comprising: i) an external stationary frame on whose inner side two holding elements are shaped at positions lying opposite one another about the axis of symmetry; ii) a movable center bar between the holding elements; iii) two movable side bars arranged on either side of the center bar; and iv) pairs of parallel connecting elements, arranged on either side of each holding element and equipped at the ends with bending points, the first connecting element being in each case joined to one side bar and one holding element, and the second connecting element being in each case joined to the same side bar and the center bar; e) an elastic element between a holding element and one end of the center bar; f) a fine adjustment element that is arranged between one holding element and one end of the center bar; and g) an objective holder, attached to the center bar, for receiving the objective. The dependent claims recite advantageous embodiments of the coordinate measuring machine.

The apparatus already described for fine positioning is arranged, with the double parallel spring element in a vertical alignment, above the measurement stage of a high-precision measuring instrument, known per se, for measuring a substrate, which has an imaging optical system arranged above it. For that purpose, a stationary supporting part to which the frame of the double parallel spring element is attached is provided above the measurement stage. An objective holder is attached to the center bar of the double parallel spring element.

An objective that has a vertically oriented objective axis is supported by the objective holder. Said axis is, in a neutral position, oriented parallel to the movement direction of the center bar, and aligns with the optical axis of the coordinate measuring instrument. The electronic control system for the fine adjustment drive of the double parallel spring can coact with an autofocus system for automatic focusing of the objective.

The coordinate measuring instrument according to the present invention has the advantage that only extremely small tilt angles of the objective axis with respect to the optical axis of the coordinate measuring instrument occur during fine positioning, i.e. during focusing of the objective. The result on the substrate is therefore a very small lateral offset of the objective axis from the optical instrument axis. With a typical mask, the vertical change in focal position resulting, for example, from its wedge error, deflection, etc. is between 10 and 20 μm. This means a focusing travel for the objective that is also no more than 20 μm, yielding a lateral offset of the objective axis in the coordinate measuring instrument according to the present invention of much less than 1 nm.

BRIEF DESCRIPTION OF THE DRAWINGS

Advantageous exemplary embodiments of the invention are explained below in more detail with reference to the drawings, in which.

DETAILED DESCRIPTION OF THE INVENTION

Figure 1:
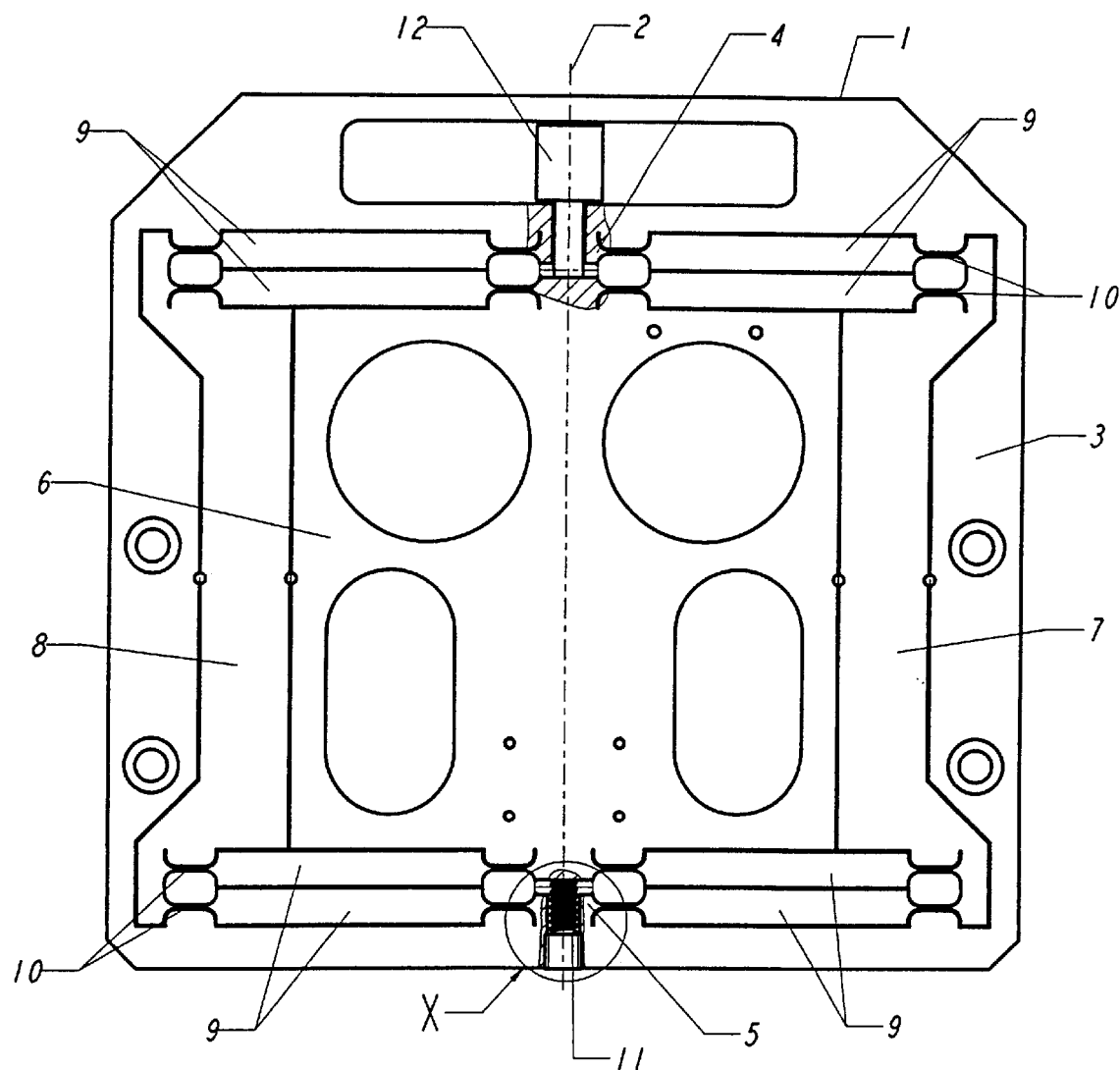
FIG. 1 shows an apparatus for fine positioning of a component with a double parallel spring element.
Figure 1A:
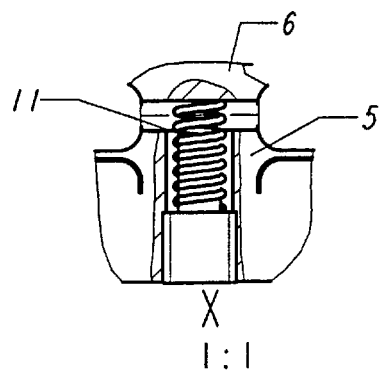
FIG. 1A is an enlarged representation of area X in FIG. 1.

FIG. 1 depicts an apparatus for fine positioning of a component. A one-piece double parallel spring element 1 having an axis of symmetry 2 has an outer stationary frame 3 on whose inner side, at positions lying opposite one another about axis of symmetry 2, are shaped two holding elements 4, 5. A movable center bar 6 is arranged between holding elements 4, 5 on axis of symmetry 2. A side bar 7, 8 is arranged on either side of center bar 6. The two side bars 7, 8 are movable substantially parallel to axis of symmetry 2.

Arranged on either side of each holding element 4, 5 are pairs of parallel connecting elements 9 that have bending points 10 at their two ends. The first connecting element 9 in each case connects a side bar 7, 8 to a holding element 4, 5. The second connecting element 9 in each case connects the same side bar 7, 8 to center bar 6. Connecting elements 9 thus form the resilient suspension system of center bar 6 with respect to frame 3 and at the same time the guidance system for the movement of center bar 6, which occurs strictly in the direction of axis of symmetry 2.

The circled area in FIG. 1 labeled with the reference character "X" is depicted in enlarged fashion in FIG. 1 a as a detail. FIG. 1 a shows that an elastic element 11, with which center bar 6 is preloaded in the direction of frame 3, is arranged between the lower end of center bar 6 and holding element 5 shaped on frame 3.

FIG. 1 shows a fine adjustment element 12 that is arranged between the upper end of center bar 5 and a holding element 4 shaped on frame 3. The movement of center bar 6 is generated with fine adjustment element 12.

When fine adjustment element 12 pushes frame 3 and center bar 6 apart against the preload, this movement occurs in a manner controlled by the resilient bending points 10. In this context, the two side bars 7, 8 act as a coupling between connecting elements 9 engaging at their ends. The two side bars 7, 8 move substantially parallel to axis of symmetry 2. In addition, however, they also perform a small movement in the direction of (or away from) center bar 6.

Under the influence of bending points 10, which here are ideally configured as wide leaf springs, center bar 6 performs a tilt-free movement along axis of symmetry 2.

In order to minimize the weight of the apparatus according to the present invention, openings have been shaped into center bar 6. Their shape and location were optimized using the finite element method, so that a vertical arrangement of the apparatus is nevertheless possible without impairing its stability.

Figure 2:
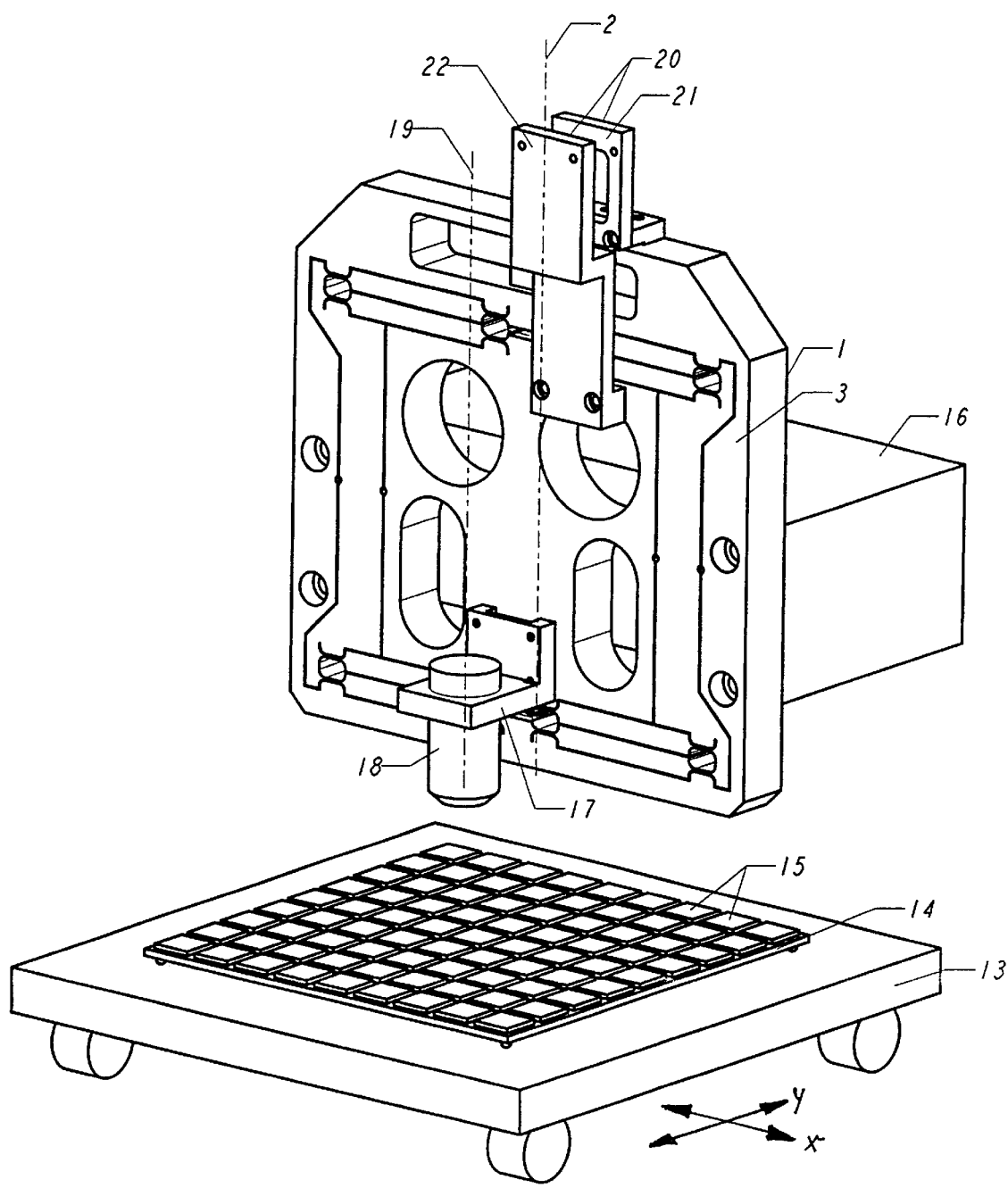
FIG. 2 shows a partial view of a high-precision measuring instrument with an apparatus for fine positioning of an objective.

FIG. 2 shows a partial view of a high-precision measuring instrument having an apparatus for fine positioning of an objective. A substrate 14 with patterns 15 rests on a measurement stage 13 that can be moved in the X and Y directions. The position of measurement stage 13 is determined with an interferometer (not shown). An apparatus for fine positioning of a component, as has already been described and depicted in FIG. 1, is arranged above measurement stage 13 in a vertical orientation. A stationary supporting part 16, to which frame 3 of double parallel spring element 1 is attached, is depicted behind double parallel spring element 1 with its axis of symmetry 2.

An objective holder 17 is attached to the lower end of center bar 6. Said holder carries an objective 18 with an objective axis 19 that is oriented parallel to axis of symmetry 2 of double parallel spring element 1 and thus parallel to the movement direction of center bar 6. An exact, tilt-free movement of center bar 6 is therefore converted directly into an equally tilt-free movement of objective 18.

In order to determine the magnitude of the movement, a high-resolution length measurement system 20 is mounted in the upper region of double parallel spring element 1. It comprises two coacting parts 21, 22, the stationary one 21 of which is mounted on the stationary frame 3, and the other 22 of which is mounted on the movable center bar 6. The co-moving part 22 on center bar 6 possesses a finely graduated scale, for example a glass scale. The other, stationary part 21 possesses a detector (not shown) for sensing the relative movement of the two parts 21, 22 with respect to one another, and thus the movement of center bar 6 and objective 18.

The measured value from high-resolution length measurement system 20 can be used as the controlled variable in an electronic control system (not shown), for example integrated into an autofocus system (not shown), to control the movement of objective 18.

Figures 3, 3A:
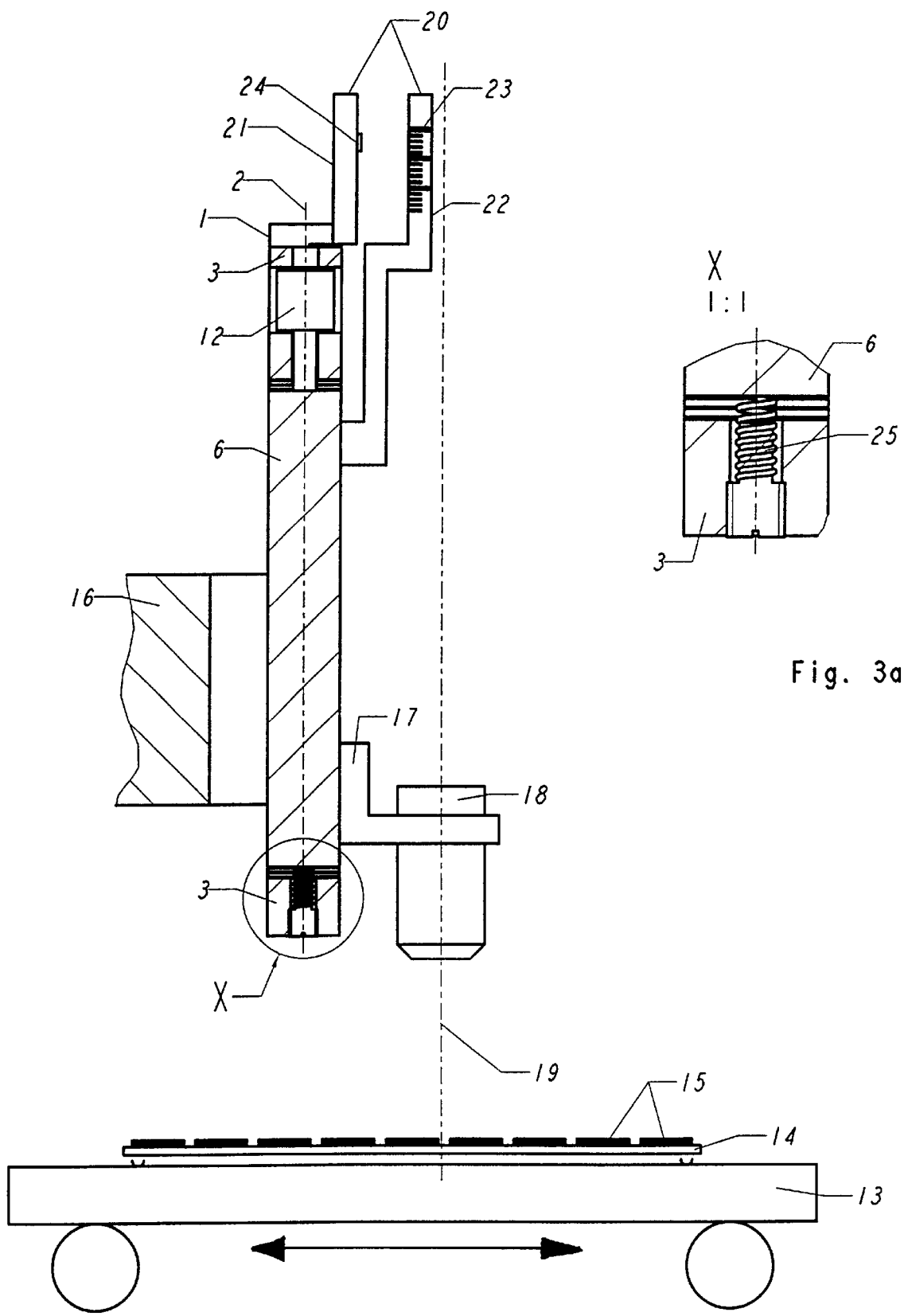
FIG. 3 shows a section through the high-precision measuring instrument of FIG. 2 with an apparatus for fine positioning of an objective.
FIG. 3a shows an enlarged detail of the area circled in FIG. 3 and labeled "X" and FIG. 4 shows a high-precision coordinating measuring instrument with an apparatus for fine positioning of an objective.

FIG. 3 shows a section through the high-precision measuring instrument of FIG. 2 having an apparatus for fine positioning of an objective.

Displaceable measurement stage 13 is once again depicted, with a substrate 14 placed on it having patterns 15 to be measured. Double parallel spring element 1 is arranged above it, and is attached with its frame 3 to a supporting part 16. The attachment is not shown, since it lies outside the section plane. Center bar 6 is arranged inside frame 3.

Mounted in the upper region of double parallel spring element 1 between frame 3 and center bar 6 is a fine adjustment element 12 with which the movement of center bar 6 is adjusted. Also mounted in the upper region of double parallel spring element 1 is a high-resolution length measurement system 20 as already depicted in FIG. 2. It is clearly evident from this depiction that it comprises two coacting parts 21, 22. Of these, the stationary one 21 is mounted on the stationary frame 3 and the other 22 is mounted on the movable center bar 6. The co-moving part 22 on the movable center bar 6 possesses a finely graduated scale 23, for example a glass scale. The other, stationary part 21 possesses a detector 24 for sensing the relative movement of the two parts 21 22 with respect to one another, and thus the movement of center bar 6 and objective 18.

Attached to the lower end of center bar 6 is an objective holder 17. The latter carries an objective 18 with an objective axis 19 that is oriented parallel to axis of symmetry 2 of double parallel spring element 1 and thus parallel to the movement direction of center bar 6. An exact, tilt-free movement of center bar 6 is therefore converted directly into an equally tilt-free movement of objective 18.

The output signal of detector 24 can be used as the controlled variable for an electronic control system (not shown) for fine adjustment drive 12 of double parallel spring 1 and thus for positioning of objective 18. The electronic control system can coact with an autofocus system for automatic focusing of objective 18.

The circled area in FIG. 3 labeled with the reference character "X" is depicted in enlarged fashion in FIG. 3a as a detail. FIG. 3a illustrates the manner in which center bar 6 is preloaded at its lower end with an elastic element, here a spring 25, in the direction of frame 3. Direct contact between center bar 6 and frame 3 is precluded, in order to prevent jamming and distortion of the two parts.

Figure 4:
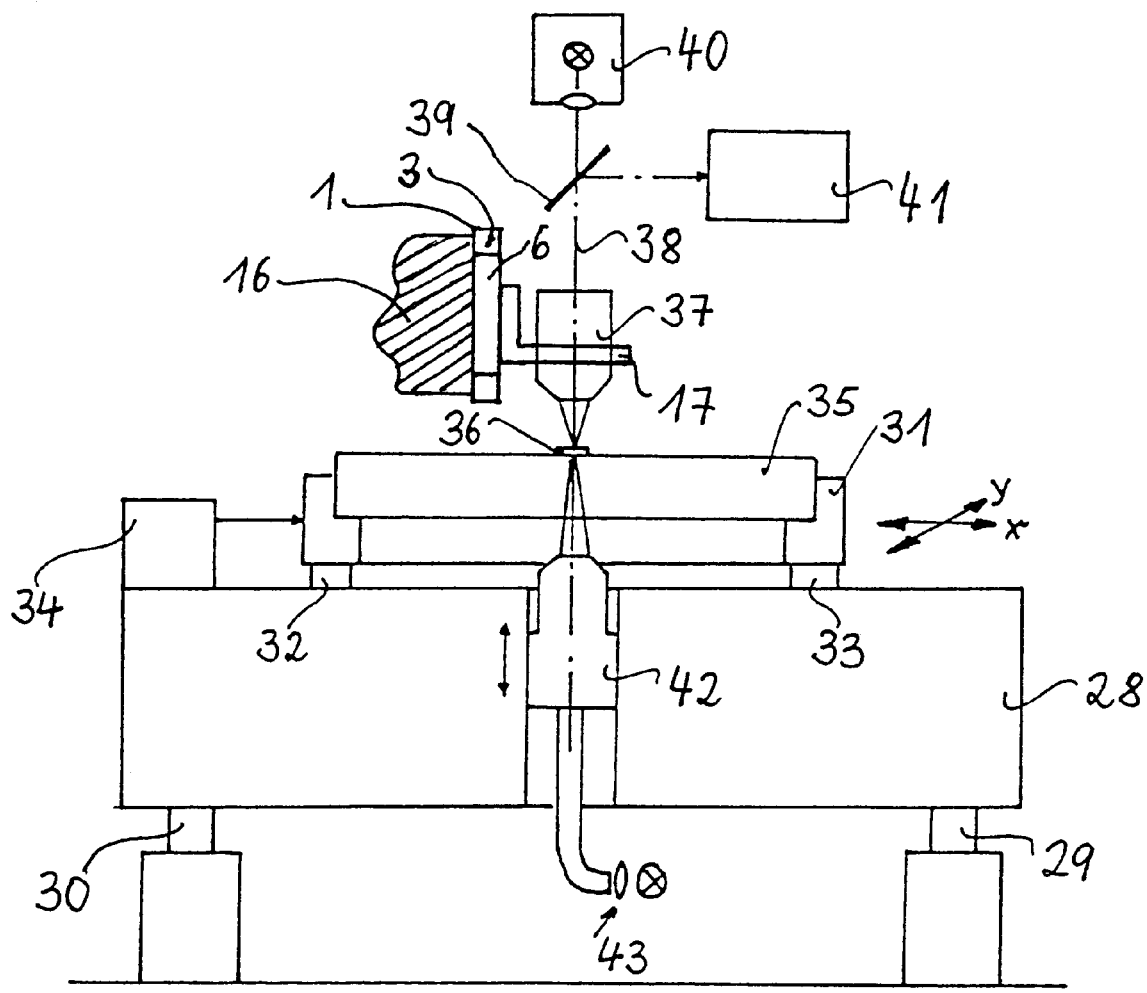

FIG. 4 shows a coordinate measuring instrument according to the present invention. It comprises a granite block 28 that is mounted in vibration-damped fashion on bases 29, 30. On granite block 28, a measurement stage 31 configured as a frame is slidingly displaceable on air bearings 32, 33 in the two directions indicated by arrows. The frame of measurement stage 31 is preferably made of a material with a low coefficient of thermal expansion, for example a glass ceramic. The drive systems for it are not depicted. The position of measurement stage 31 is measured in the X and Y directions with a laser interferometer system 34.

A mask 35 is introduced into the frame of measurement stage 31. Mask 35 is made, for example, of quartz glass. Patterns 36 are present on the mask surface. Since measurement stage 31 is configured as a frame, mask 35 can also be transilluminated from below.

Located above mask 35 is an imaging system having an objective 37 of high optical quality that is adjustable in the Z direction along its optical axis 38 for focusing. By way of a beam-splitter mirror 39, on the one hand the light of a light source 40 is introduced into the optical beam path, and on the other hand the imaging beams are directed onto a detector device 41. Detector device 41 is, for example, a CCD camera having a high-resolution pixel array. Light source 40 emits in the near UV spectral region.

Set into granite block 28 is a further illumination device that comprises an adjustable-height condenser 42 and a light source 43. The exit surface of a light guide can also be provided as light source 43. The optical axis of condenser 42 is aligned with optical axis 38 of objective 37. The height adjustment of condenser 42 with light source 43 is used to adapt the illumination beams being directed onto pattern 36 to different optical thicknesses of different masks 35. The condenser head can, in particular, extend into the open part of the measurement stage frame. In order to prevent damage during stage displacements over the entire substrate surface, however, it can also be pulled beneath the surface of the granite block. Light sources 40 and 43 can be activated independently of one another.

Double parallel spring 1 that has already been described is arranged in a vertical orientation above measurement stage 32. For that purpose, a supporting part 16 to which frame 3 of double parallel spring 1 is attached is provided above measurement stage 31. An objective holder 17 is attached to center bar 6 of double parallel spring 1.

Objective holder 17 carries objective 37. In the neutral position, its optical axis is oriented parallel to the movement direction of center bar 6 and aligns with the optical axis of the coordinate measuring instrument.

The present invention was described with reference to exemplary embodiments. It is nevertheless apparent to any person skilled in this art that changes and modifications can be made without thereby leaving the range of protection of the claims recited below.

PARTS LIST

1 Double parallel spring element
2 Axis of symmetry
3 Frame
4 Holding element
5 Holding element
6 Center bar
7 Side bar
8 Side bar
9 Connecting elements
10 Bending points
11 Elastic element
12 Fine adjustment element
13 Measurement stage
14 Substrate
15 Patterns
16 Supporting part
17 Objective holder
18 Objective
19 Objective axis
20 Length measurement system
21 Stationary part
22 Co-moving part
23 Scale
24 Detector
25 Spring
26 Granite block
29 Base
30 Base
31 Measurement stage
32 Air bearing
33 Air bearing
34 Laser interferometer system
35 Mask
39 Beam-splitter mirror
40 Light source
41 Detector unit
42 Condenser
43 Light source

What is claimed is:
1. An apparatus for fine positioning of a component comprises:
 a) a one-piece double parallel spring element (1) having an axis of symmetry (2), comprising
  i) an external stationary frame (3) on whose inner side two holding elements (4, 5) are shaped at positions lying opposite one another about the axis of symmetry (2);

ii) a movable center bar (6) between the holding elements (4, 5);

iii) two movable side bars (7, 8) arranged on either side of the center bar (6); and iv) pairs of parallel connecting elements (9), arranged on either side of each holding element (4, 5) and equipped at the ends with bending points (10), the first connecting element (9) being in each case joined to one side bar (7, 8) and one holding element (4, 5), and the second connecting element (9) being in each case joined to the side bar (7, 8) and the center bar (6);

b) an elastic element (11) between a holding element (4, 5) and one end of the center bar (6); and c) a fine adjustment element (12) that is arranged between one holding element (4, 5) and one end of the center bar (6).

2. The apparatus as defined in claim 1, wherein the double parallel spring element (1) is produced from a material having a low coefficient of thermal expansion and good flexural characteristics.

3. The apparatus as defined in claim 1, wherein the double parallel spring element (1) is produced from a Ni36 steel plate.

4. The apparatus as defined in claim 1, wherein the bending points (10) or the entire double parallel spring element (1) is shaped using an electrodischarge method so that it is configured in stress-free fashion.

5. The apparatus as defined in claim 1, wherein the bending points (10) are configured as leaf springs.

6. The apparatus as defined in claim 1, wherein the energy transfer points of the elastic element (11) and of the fine adjustment element (12) lie on the axis of symmetry (2).

7. The apparatus as defined in claim 1, wherein the elastic element (11) is configured as a compression spring or a tension spring.

8. The apparatus as defined in claim 1, wherein the center bar (6) is preloaded by the elastic element (11) in the direction of the frame (3).

9. The apparatus as defined in claim 1, wherein spacers are shaped on the inner side of the frame (3) opposite the ends of the side bars (7, 8).

10. The apparatus as defined in claim 1, wherein the fine adjustment element (12) is configured as a manually driven or motor-driven fine adjustment screw or as a piezoelement.

11. The apparatus as defined in claim 1, wherein the fine adjustment element (12) has associated with it a high-resolution length measurement system (20) for measuring its instantaneous setting, and an electronic control system, the measured values of the length measurement system (20) constituting the controlled variable for the electronic control system.

12. The apparatus as defined in claim 1, wherein the electronic control system coacts with an autofocus system for automatic focusing of the objective (18).

13. The apparatus as defined in claim 1, wherein in order to achieve a symmetrical load distribution, the objective holder (17) with the objective (18) retained thereon is arranged on the front side of the center bar (6), and the fine adjustment element (12) is arranged on the rear side of the center bar (6).

14. The apparatus as defined in claim 1, wherein the apparatus is configured for vertical fine positioning, and the component is an objective (18).

15. The apparatus as defined in claim 14, wherein the objective (18) defines an optical axis that is parallel to the movement direction defined by the center bar (6).

16. The apparatus as defined in claim 1, wherein the fine adjustment element (12) is adjustable in a vertical direction in tilt-free fashion against the force of the elastic element (11).

17. The apparatus as defined in claim 1, wherein the elastic element (11) is a spring that preloads the center bar (6) in the direction of the frame (3).

18. Use of an apparatus as defined in claim 1, wherein the apparatus is provided in a high-precision coordinate measuring instrument for fine positioning of an objective (37) that is to be focused.

19. A coordinate measuring instrument for determining the position, relative to a reference point, of patterns (36) on a transparent substrate (35) comprises:

a) an incident-light illumination device (37, 40) on a vertical optical axis;

b) a frame-shaped measurement stage (4), displaceable vertically and relative to the optical axis (38) and having an interferometric position determination system (34), for receiving the substrate (35);

c) an imaging device having an objective (37) that is to be focused, for imaging the patterns (36) of the substrate (35);

d) a vertically arranged one-piece double parallel spring element (1) having an axis of symmetry (2), comprising i) an external stationary frame (3) on whose inner side two holding elements (4, 5) are shaped at positions lying opposite one another about the axis of symmetry (2);

ii) a movable center bar (6) between the holding elements (4, 5);

iii) two movable side bars (7, 8) arranged on either side of the center bar (6); and iv) pairs of parallel connecting elements (9), arranged on either side of each holding element (4, 5) and equipped at the ends with bending points (10), the first connecting element (9) being in each case joined to one side bar (7, 8) and one holding element (4, 5), and the second connecting element (9) being in each case joined to the same side bar (7, 8) and the center bar (6);

e) an elastic element (I1) between a holding element (4, 5) and one end of the center bar (6);

f) a fine adjustment element (12) that is arranged between one holding element (4, 5) and one end of the center bar (6); and g) an objective holder (17), attached to the center bar (6), for receiving the objective (18).

20. The coordinate measuring instrument as defined in claim 19, wherein the fine adjustment element (12) is configured as a manually driven or motor-driven fine adjustment screw or as a piezoelement.

21. The coordinate measuring instrument as defined in claim 19, wherein the fine adjustment element (12) has associated with it a high-resolution length measurement system (20) for measuring its instantaneous setting, and an electronic control system, the measured values of the length measurement system (20) constituting the controlled variable for the electronic control system.

22. A coordinate measuring instrument for determining the position, relative to a reference point, of patterns (36) on a transparent substrate (35) comprises:

a) a transmitted-light illumination device (42, 43) on a vertical optical axis;

b) a frame-shaped measurement stage (4), displaceable vertically and relative to the optical axis (38) and having an interferometric position determination system (34), for receiving the substrate (35);

c) an imaging device having an objective (37) that is to be focused, for imaging the patterns (36) of the substrate (35);

d) a vertically arranged one-piece double parallel spring element (1) having an axis of symmetry (2), comprising
   i) an external stationary frame (3) on whose inner side two holding elements (4, 5) are shaped at positions lying opposite one another about the axis of symmetry (2);
   ii) a movable center bar (6) between the holding elements (4, 5);
   iii) two movable side bars (7, 8) arranged on either side of the center bar (6); and
   iv) pairs of parallel connecting elements (9), arranged on either side of each holding element (4, 5) and equipped at the ends with bending points (10), the first connecting element (9) being in each case joined to one side bar (7, 8) and one holding element (4, 5), and the second connecting element (9) being in each case joined to the same side bar (7, 8) and the center bar (6);

e) an elastic element (11) between a holding element (4, 5) and one end of the center bar (6);

f) a fine adjustment element (12) that is arranged between one holding element (4, 5) and one end of the center bar (6); and g) an objective holder (17), attached to the center bar (6), for receiving the objective (18).

23. A coordinate measuring instrument for determining the position, relative to a reference point, of patterns (36) on a transparent substrate (35) comprises:

a) an incident-light illumination device (37, 40) and a transmitted-light illumination device (42, 43) on a common vertical optical axis;

b) a frame-shaped measurement stage (4), displaceable vertically and relative to the optical axis (38) and having an interferometric position determination system (34), for receiving the substrate (35);

c) an imaging device having an objective (37) that is to be focused, for imaging the patterns (36) of the substrate (35);

d) a vertically arranged one-piece double parallel spring element (1) having an axis of symmetry (2), comprising
   i) an external stationary frame (3) on whose inner side two holding elements (4, 5) are shaped at positions lying opposite one another about the axis of symmetry (2);
   ii) a movable center bar (6) between the holding elements (4, 5);
   iii) two movable side bars (7, 8) arranged on either side of the center bar (6); and
   iv) pairs of parallel connecting elements (9), arranged on either side of each holding element (4, 5) and equipped at the ends with bending points (10), the first connecting element (9) being in each case joined to one side bar (7, 8) and one holding element (4, 5), and the second connecting element (9) being in each case joined to the same side bar (7, 8) and the center bar (6);

e) an elastic element (11) between a holding element (4, 5) and one end of the center bar (6);

f) a fine adjustment element (12) that is arranged between one holding element (4, 5) and one end of the center bar (6); and g) an objective holder (17), attached to the center bar (6), for receiving the objective (18).

24. The coordinate measuring instrument as defined in claim 23, wherein the electronic control system coacts with an autofocus system for automatic focusing of the objective (18).

\* \* \* \* \*